(12) United States Patent
Rehrig (10) Patent No.: US 6,525,288 B2
(45) Date of Patent: Feb. 25, 2003

(54) GAS LENS ASSEMBLY FOR A GAS SHIELDED ARC WELDING TORCH

(76) Inventor: Richard B. Rehrig, P.O. Box 1870, San Marcos, CA (US) 92079

( * ) Notice: Subject to any disclaimer, the term of this patent is extended or adjusted under 35 U.S.C. 154(b) by 0 days.

(21) Appl. No.: 09/812,289

(22) Filed: Mar. 20, 2001

(65) Prior Publication Data

US 2002/0134760 A1 Sep. 26, 2002

(51) Int. Cl.[7] ................................................ B23K 9/167
(52) U.S. Cl. ................................. 219/74; 219/134.42
(58) Field of Search ........................... 219/75, 137.42

(56) References Cited

U.S. PATENT DOCUMENTS

| | | | | |
|---|---|---|---|---|
| 2,468,805 A | | 5/1949 | Herbst | 219/15 |
| 2,512,707 A | | 6/1950 | Anderson | 219/15 |
| 3,053,968 A | | 9/1962 | Gorman et al. | 219/74 |
| 3,087,045 A | * | 4/1963 | Correy et al. | 219/74 |
| 3,180,967 A | * | 4/1965 | Hill | 219/75 |
| 4,788,401 A | | 11/1988 | Kleppen | 219/75 |
| 5,003,150 A | * | 3/1991 | Stricklen | 219/136 |
| 5,393,949 A | | 2/1995 | Stricklen | 219/74 |
| 5,403,987 A | | 4/1995 | Rehrig | 219/75 |
| 5,556,550 A | * | 9/1996 | Fyffe | 219/136 |
| 5,772,102 A | * | 6/1998 | New et al. | 219/137.42 |
| 6,207,921 B1 | * | 3/2001 | Hanna | 219/136 |

* cited by examiner

Primary Examiner—M. Alexandra Elve
Assistant Examiner—Kevin McHenry
(74) Attorney, Agent, or Firm—Holland & Knight LLP (57) ABSTRACT

A gas lens assembly for use in a gas shielded welding torch to provide laminar gas flow to the weld puddle. The assembly includes a plurality of annular fine mesh inner filter screens mounted in fixed axially spaced disposition in a gas chamber formed between the lens body and lens sleeve. The filter screens are preferably spaced apart a predetermined distance by a plurality of wave-shaped open mesh spacer discs disposed in a sandwich configuration between the filter screens. A stack of adjacently disposed outer filter screens are mounted in the gas chamber outwardly of the fine mesh filter screens. Each of the outer screens in the stack is individually removable such that the outermost screen can be readily peeled from the stack when damaged by spatter or heat to maintain the laminar gas flow through the assembly and prolong the useful life of the assembly.

29 Claims, 4 Drawing Sheets

GAS LENS ASSEMBLY FOR A GAS SHIELDED ARC WELDING TORCH

BACKGROUND OF THE INVENTION

The present invention relates to gas shielded tungsten-arc welding torches commonly referred to as GTAW or TIG torches, and more particularly to an improved gas lens assembly for use on such torches. In the GTAW or TIG welding process, a welding torch is used to direct electrical current in a protective inert shielding gas (usually argon) to the weld puddle area. The flow and shielding provided by the gas is critical to the quality of the weld deposit. The gas flow must be laminar as a turbulent gas flow can cause air containing oxygen and oxides to come into contact with the weld puddle and create significant weld quality problems. Over the years, various configurations of what are called gas lenses have been developed to provide a laminar flow of shielding gas to the weld puddle. Examples of such gas lens assemblies are found in U.S. Pat. Nos. 3,180,967, 4,788,401, 5,393,949, 5,556,550 and 5,772,102.

After almost forty years, the original concepts disclosed in U.S. Pat. No. 3,180,967 are still used extensively in gas lens assemblies. The gas lens system disclosed therein and others currently in use generally comprise a series of axially aligned fine mesh wire filter screens secured within the torch nozzle about the electrode between downstream end portions of the gas lens body and the surrounding gas lens sleeve. The filter screens are of a flat annular configuration, are spaced apart by inner and outer metal rings to form a series of chambers between the screens and are held in place between the gas lens body and sleeve by retaining rings or by rolling the extended edge of the surrounding sleeve about the rings and screens. While these lens systems generally provide the desired laminar gas flow, they are costly to manufacture and assemble as the component parts require precision machinery and must be individually installed.

In addition to the high cost of production, the outer screens in these gas lens assemblies are highly susceptible to damage caused by metal spatter from the molten weld puddle and from exposure to excessive heat. When molten metal spatter comes in contact with the outer gas lens screen or sintered metal disc (sometimes used in lieu of an outer screen), the spatter will adhere to or melt the screen or disc causing disruption of the laminar glass flow and rendering the gas assembly useless. Extremely high temperatures are generated by the electric arc and molten weld puddle and by stray high frequency electrical current arcing across the screen area. Excessive heat will also melt or warp the outer filter screen or sintered disc. Such damage is critical as these gas lens assemblies generally do not allow for removal of the screens or discs from the main gas lens assembly body, thus necessitating replacement of the entire assembly when the outer screen or disc becomes damaged. While U.S. Pat. No. 5,772,102 does disclose a gas control device in which the outer end of the gas lens assembly containing the mesh screens is removable, that device does not allow for individual screen replacement. It only allows for replacement of all the filter screens as a single unit. Thus, while such replacement is less expensive than replacement of the entire gas lens assembly, it is still costly as the screen unit has several parts, requiring precision machining and costly assembly time. Thus, the problems of costly construction and part replacement continues. The gas lens assembly of the present invention obviates these problems.

SUMMARY OF THE INVENTION

Briefly, the present invention is directed to an improved gas lens assembly for gas shielded arc welding torches which provides directional control and laminar flow of the shielding gas, is of an economical construction and allows for rapid replacement of the outer screens in the event of damage caused by metal spatter or excessive heat exposure. In the preferred embodiment of the present invention the lens assembly includes a conventional gas lens body and surrounding sleeve and a plurality of annular wave-shaped mesh spacer discs disposed between and axially aligned with a plurality of annular fine mesh flat inner filter screens so as to form a sandwich configuration wherein the fine mesh filter screens are held in a predetermined axially spaced relationship by the elevational component of the wave-shaped spacer discs. A plurality of flat annular outer filter screens having a coarser mesh than the sandwiched inner screens are stacked outwardly adjacent and in axial alignment with the sandwich configuration of inner screens and wave-shaped spacer discs. The inner screens, wave-shaped spacer discs and outer screens are all held in place by a single retaining ring. Each of the outer screens defines a pull-out tab projecting outwardly therefrom enabling the torch operator to peel off the outermost screen from the stack of outer screens to expose a fresh outer screen upon the outermost screen being damaged by heat or metal spatter. Alternatively, a notch can be provided in the outer end portion of gas lens sleeve surrounding the outer screens to provide access to perimeter portions of the stacked outer screens to enable the torch operator to peel off the damaged outmost screen.

In a first alternate embodiment of the present invention, a plurality of annular spacer rings are employed in lieu of the annular wave-shaped mesh spacer discs of the prior embodiment to maintain the fine mesh inner filter screens in the desired axially spaced relationship. The axial spacing between each pair of inner filter screens is defined by the thickness of the spacer ring disposed therebetween. The plurality of stacked individually removable outer filter screens having the coarser mesh are disposed outwardly adjacent the sandwiched inner screens as in the prior embodiment. In a second alternative embodiment of the present invention, the sandwiched configuration of fine mesh inner flat screens is replaced with a layer of porous filter media made of metal, ceramics or fitted glass. Again, the plurality of stacked individually removable outer filter screens having the coarser mesh are employed as described in the prior embodiments.

It is the principal object of the present invention to provide an improved gas lens assembly for gas shielded arc welding torches.

It is another object of the present invention to provide such a lens assembly which is of simple construction and economical to manufacture.

It is yet another object of the present invention to provide an efficient gas lens assembly which is compatible with most industry standard gas shielded arc welding torch models and uses traditional ceramic gas nozzles to reduce the cost of operation.

It is a still further object and advantage of the present invention to provide an improved gas lens assembly for gas shielded arc welding torches of the type using a plurality of spaced filter screens which allows for the quick and simple removal of a damaged screen at the work station without having to replace the entire gas lens assembly.

It is yet another object of the present invention to provide a gas lens assembly for gas shielded arc welding torches of the type utilizing a plurality of spaced filter screens which allows for the individual outer screens to be easily and quickly removed when damaged exposing a fresh outer screen to increase the life of the lens assembly and reduce the cost of operation.

It is a still further object of the present invention to provide an improved gas lens assembly construction for gas shielded arc welding torches which is adaptable for use with such torches of varying size and construction.

These and other objects and advantages of the present invention will become readily apparent from the following detailed description taken in conjunction with the accompanying drawings.

DETAILED DESCRIPTION OF THE PREFERRED EMBODIMENTS

Figure 1:
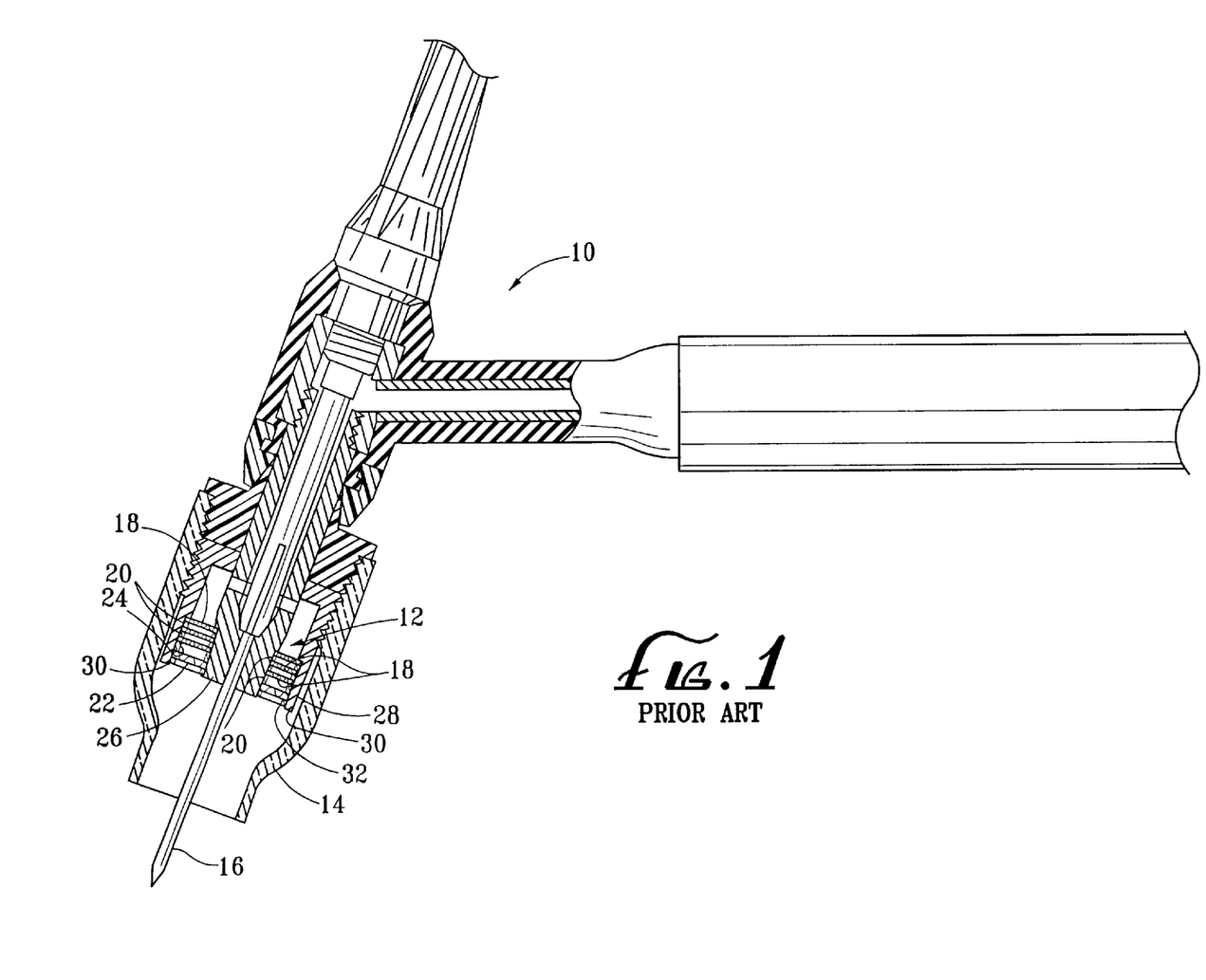
FIG. 1 is a partial sectional side view of a gas shielded arc welding torch illustrating the configuration of the prior art.

Referring now in detail to the drawings, FIG. 1 illustrates a typical gas shielded welding torch 10 employing a gas lens assembly 12 of the type found in the prior art. Lens assembly 12 is positioned within the torch nozzle 14 about electrode 16 and is comprised of a plurality of flat fine mesh filter screens 18 spaced axially apart by annular metal spacing rings 20. Filter screens 18 typically have a mesh size of about 200. An outer and coarser flat mesh filter screen 22 is in axial alignment with the finer inner screens 18 and spaced outwardly therefrom by a metal spacing ring 24. The outer screen has a mesh size of about 80 to 100. The filter screens and spacing rings in the lens assembly 12 are held in place between a gas lens body 26 and surrounding gas lens sleeve 28 by machine rolling of the outer end portion 30 of sleeve 28 about a bottom retaining ring 32. Alternatively, a snap ring (not shown) could be utilized in conjunction with an annular offset in the lower end portion of gas lens sleeve 28 to secure the filter screens and spacing rings in place. In many such torches, the lens body is defined by the lower end portion of the collect body. In others, the lens body is defined by an annular plug or inner sleeve. In such gas lens assemblies, the axially spaced fine filter screens eliminate the turbulence in the gas flow to provide the desired laminar flow. The function of the coarse outer screen 22 is to protect the finer filter screens 18 from metal spatter and excessive heat during the welding operation.

The above-described lens assembly 12 of the prior art as well as other such assemblies heretofore in use are costly to produce as a result of the time and precision machinery required for manufacture and assembly of the secured stack of screens and spacers. In addition, such an assembly does not allow for the replacement of the outer screen 22 when that screen becomes damaged by excessive heat or clogged with spatter from the weld puddle or from the operator's unintentional touching of the filler rod (not shown) to the tungsten electrode 16. While the coarser construction of the outer screen 22 does provide some protection from spatter for the finer inner filter screens 18, the outer screen 22 still will clog with use and is also susceptible to heat damage. As a result, the gas lens assemblies of the prior art are not only costly to manufacture, they also have an undesirably short useful life.

Figures 2, 2A:
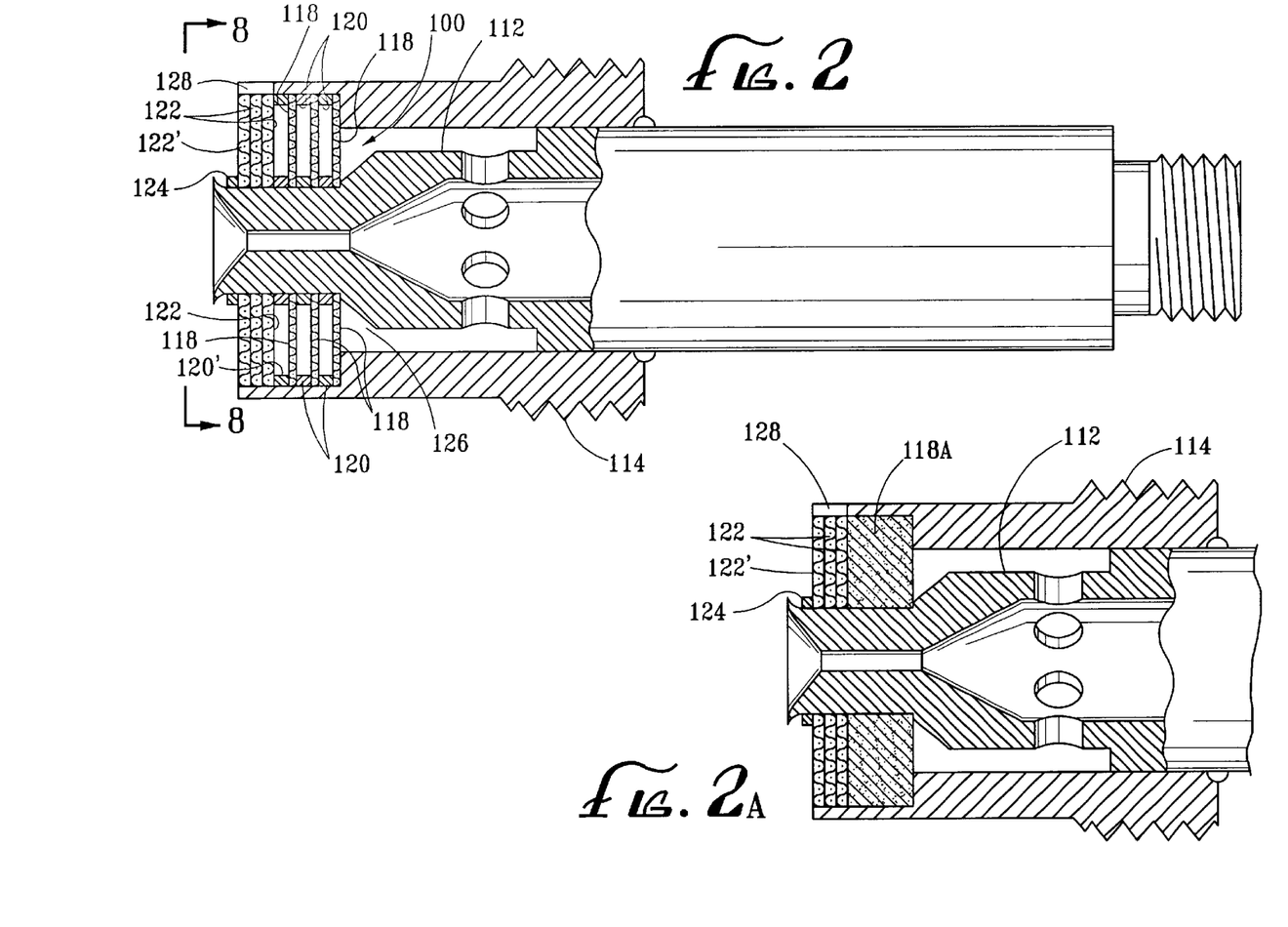
FIG. 2 is a partial sectional side view of a gas shielded arc welding torch employing a gas lens assembly of the present invention utilizing the stack of individually removable outer screens.
FIG. 2A is a partial sectional side view of an alternate configuration of a gas shielded arc welding torch employing a gas lens assembly of the present invention utilizing the stack of individually removable outer screens.

A first embodiment of the gas lens assembly 100 of the present invention is illustrated in FIG. 2. Lens assembly 100, like assembly 12 of the prior art, is positioned within a ceramic nozzle (not shown) between the copper gas lens body 112 and the brass gas lens sleeve 114. As with conventional torches, the configurations of the lens body and sleeve can vary with the torch design. Gas lens assembly 100 also comprises a plurality of flat fine mesh filter screens 118 spaced axially apart by annular spacing rings 120. As in the prior art, the fine mesh screens have a mesh size of about 200. The axially spaced fine filter screens 118 function in the same manner as the above-discussed screens 18 in the prior art to provide the desired laminar gas flow. However, to protect the fine filter screens 118, the present invention employs a stack of removable outer screens 122 in lieu of a single immovable screen.

As seen in FIG. 2, externally adjacent the outermost spacing ring 120' is a stack of at least two and more preferably three coarse mesh filter screens 122 which are disposed in axial alignment with the inner fine mesh screens 118. The coarse mesh screens 122 have a mesh size of about 60 to 100 and more preferably are within the range of 80 to 100, so as to be sufficiently coarse so as to provide protection from spatter for the fine mesh filter screens 118, sufficiently open so as to not adversely affect the gas flow therethrough, and sufficiently rigid so as to be self supporting within the torch nozzle between the gas lens body 112 and gas lens sleeve 114. So configured, only a single inner metal retaining ring 124 need be provided about the outer end of the gas lens body so as to prevent the coarse outer filter screens 122 from slipping from the gas chamber 126 formed between the gas lens body and sleeve. A notch 128 is preferably provided in the outer end portion of the gas lens sleeve 114 to provide access to the outer perimeter portion of the adjacently stacked outer filter screens 122.

In use, when the outermost protective screen 122' becomes damages either by an accumulation of spatter or by exposure to excessive heat, the torch operator can simply remove the ceramic gas nozzle (not shown in FIG. 2), peel off the outermost screen 122' from the stack of screens 122 leaving a fresh new outer screen 122 in its place. Thus, the embodiment of the present invention illustrated in FIG. 2, while retaining the relatively expensive sandwich construction of aligned inner filter screens and spacing rings, allows the torch operator to rapidly replace the outermost coarse mesh screen which is the screen most susceptible to damage during use, thereby significantly prolonging the useful life of the lens assembly.

It should be noted that the inner and outer wire mesh filter screens illustrated in the drawings are enlarged in thickness relative to the other components of the gas lens assemblies to better illustrate the configurations of the filter screens. For example, one of the inner fine mesh filter screens 118 having a mesh size of 200 and an outer diameter of 0.560 inch, would have a thickness of about 0.004 inch. One of the coarser outer screens 122 having a mesh size of about 80 to 100 and the same outer diameter of 0.560 inch would have a thickness of about 0.011 inch. The spacing rings 120 employed in the embodiment of the invention illustrated in FIG. 2 will vary in thickness depending on the size of a torch. For example, in a model 17 torch, the spacing rings 120 would have a thickness of about 0.040 inch.

In an alternative embodiment of the gas lens assembly of the present invention, the sandwiched configuration of the inner fine mesh filter screens 118 and spacing rings 120 are replaced with one or more layers of porous filter media made of metal, ceramics or fitted glass. A lightly compressed porous sintered metal disc made of copper or brass could also be used to define the layer of porous filter media. The stack of two or more individually removable coarse mesh outer protective screens 122 would be employed in the same manner described above. An example of a lens assembly employing a layer of porous filter media 118A is shown in FIG. 2A.

The above-discussed embodiments of the gas lens assemblies 100 illustrated in FIGS. 2 and 2A incorporating the stack of individually replaceable coarse screens 122 significantly enhance the useful life of the lens assembly. Another aspect of the present invention is directed toward the cost of construction of the assembly. In a more preferred embodiment of the present invention illustrated in FIG. 3, the gas lens assembly 200 replaces the stacked alignment of fine mesh filter screens 118 and spacer rings 120 of the prior embodiment with a stacked alignment of fine mesh filter screens 218 spaced apart by wave-shaped mesh spacer discs 220. The fine filter screens 218 are identical to the fine filter screens 118 of the lens assembly embodiment shown in FIG. 2.

Figure 3:
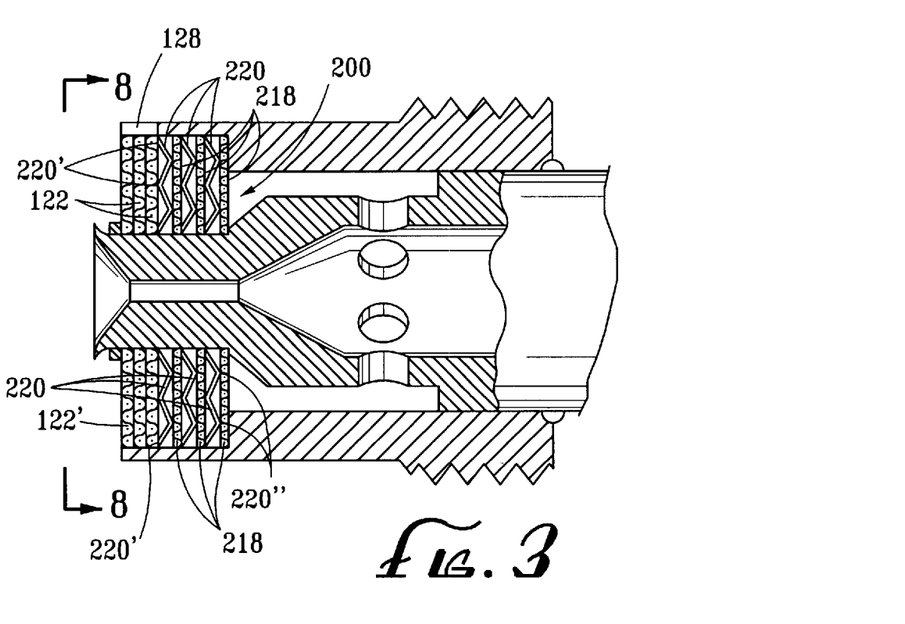
FIG. 3 is a partial sectional side view of a gas shielded arc welding torch employing a preferred embodiment of a gas lens assembly of the present invention utilizing the stack of individually removable outer screens and the wave-shaped spacers with the fine mesh inner filter screens.
Figure 4:
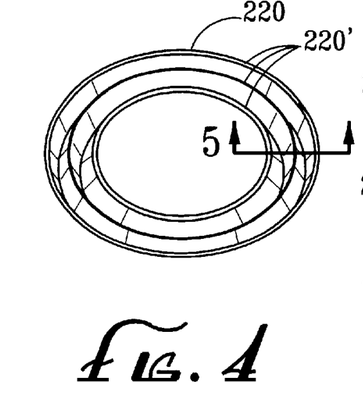
FIG. 4 is a perspective view of a wave-shaped spacer disc employed in the gas lens assembly of the present invention.
Figure 5:
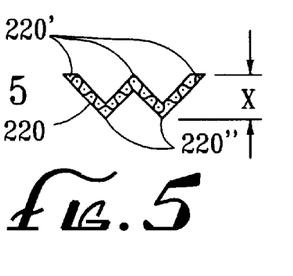
FIG. 5 is a sectional view taken along the line 5—5 in FIG. 4.
Figure 5A:
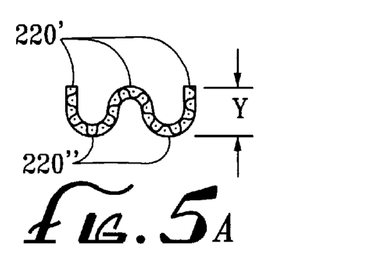
FIG. 5A is a sectional view of an alternate configuration of a wave-shaped spacer disc employed in the gas lens assembly of the present invention.
Figure 6:
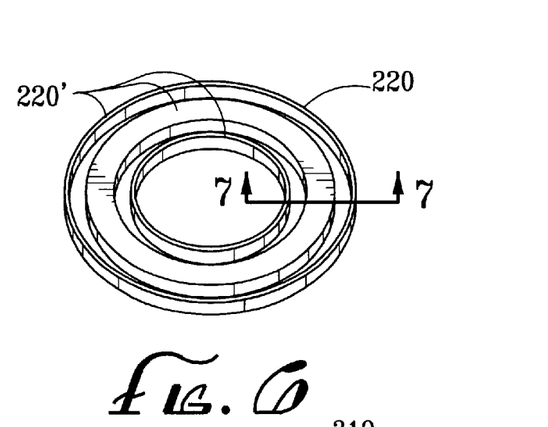
FIG. 6 is a perspective view of a further alternate configuration of a wave-shaped spacer disc employed in the gas lens assembly of the present invention.
Figure 7:
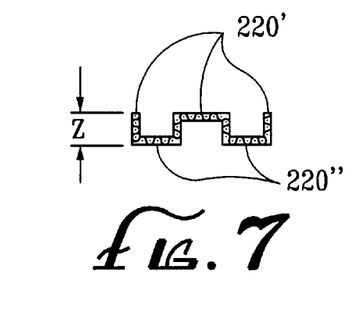
FIG. 7 is a sectional view taken along the line 7—7 in FIG. 6.
Figure 8:
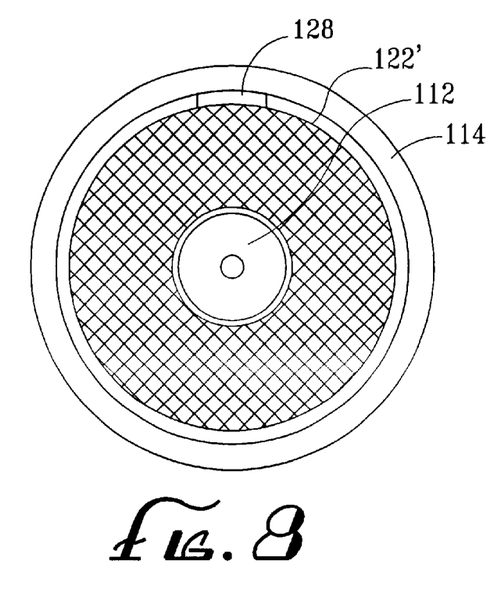
FIG. 8 is a bottom plan view of the gas shielded arc welding torch as seen from line 8—8 in either FIG. 2 or FIG. 3.

The wave-shaped mesh spacer discs 220 are of relatively coarse construction (approximately 40–60 mesh) and can be of a straight line "W"-shaped wave configuration as shown in FIGS. 3, 4 and 5, or of a curved wave configuration as shown in FIG. 5A, a box-wave configuration as shown in FIGS. 6 and 7, or of a similar shape which provides a first plurality of contact surfaces 220' lying in a first plane and a second plurality of contact surfaces 220" lying in a second plane, with the two planes being parallel to each other, perpendicular to the central axis of the electrode and spaced apart a distance referred to herein as the elevational component to the spacer discs 220. This elevational component defined by the wave configuration is represented by the letters X, Y and Z in FIGS. 5, 5A and 7 respectively. As seen in FIGS. 3 and 5, the axially-spaced contact surfaces 220' and surfaces 220" on each spacer disc 220 abut separate but proximately spaced filter screens so as to position the screens in a parallel disposition and provide the desired axial spacing of the fine mesh filter screens 218 in the gas lens assembly 200 to produce the desired laminar gas flow. The preferred gas lens assembly 200 of FIG. 3 also employs the axially aligned stack of "peel-off" outer screens 122 and access notch 128 of the earlier discussed prior embodiment illustrated in FIG. 2.

Unlike the spacing rings used in the prior art, the relatively coarse wave-shaped spacer discs 220 can be mass produced by a metal stamping process and easily stacked to form the desired sandwich construction with filter screens 218, significantly reducing the cost of the components in the gas lens assembly and time of assembly. By way of example, in a gas lens assembly utilizing three fine mesh filter screens 218 having a mesh size of 200, an outer diameter of 0.560 in. and a thickness of 0.004 in., the spacer discs 220 would each define the same outer diameter as the fine mesh filter screens and have an elevational component X, Y or Z of 0.040 in.

Figure 3A:
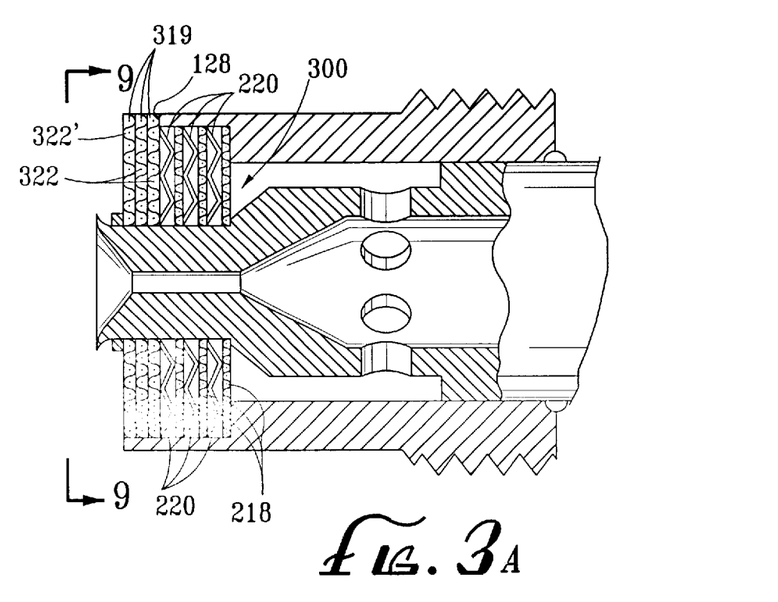
FIG. 3A is a partial sectional side view of a gas shielded arc welding torch employing an alternate preferred embodiment gas lens assembly of the present invention utilizing the stack of individually removable outer screens with pull tabs and the wave-shaped spacers with the fine mesh inner filter screens.
Figure 9:
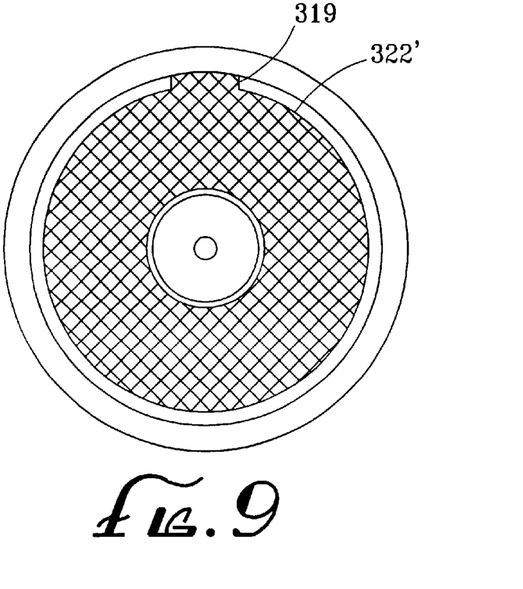
FIG. 9 is a bottom plan view of the gas shielded arc welding torch as seen from line 9—9 in FIG. 3A.

FIG. 3A illustrates a modified preferred embodiment of the present invention which differs from the embodiment of FIG. 3 in that each of the protective outer filter screens 322 is provided with an integrally formed and outwardly extending tab 319 (see FIG. 9) which projects into the access notch 128 in the gas lens sleeve to facilitate the peeling-off of the outermost screen 322' when damaged to expose a new outer screen. Otherwise, the gas lens assembly 300 of FIG. 3A is identical to assembly 200 of FIG. 3. It is to be understood that the inclusion of an outwardly extending tab on the outer filter screens could also be employed with the embodiments of the present invention illustrated in FIGS. 2 and 2A. Various other changes and modifications may be made in carrying out the present invention without departing from the spirit and scope thereof. Insofar as these changes and modifications are within the purview of the appended claims, they are to be considered as part of the present invention.

I claim:

1. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, a plurality of annular fine mesh inner filter screens mounted in fixed axially-spaced disposition about said lens body in said gas chamber, a stack of adjacently disposed and axially aligned annular outer filter screens mounted about said lens body in said gas chamber outwardly of said fine mesh filter screens such that an outermost screen in said stack is individually removable from said stack and gripping means for enabling one to grasp the outermost of said outer filter screens and peel said outermost screen from said stack upon said outermost screen being damaged whereby laminar gas flow through said lens assembly is maintained and the useful life of the assembly prolonged.

2. The gas lens assembly of claim 1 wherein said inner filter screens are axially positioned in said gas chamber by a plurality of fixed spacer rings disposed in a sandwich configuration between said inner filter screens to provide a desired predetermined axial spacing therebetween and wherein said outer filter screens are individually held in said gas chamber by a retaining ring disposed about said lens body.

3. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, a plurality of annular fine mesh inner filter screens mounted in fixed axially-spaced disposition about said lens body in said gas chamber, a stack of adjacently disposed and axially aligned annular outer filter screens mounted about said lens body in said gas chamber outwardly of said fine mesh filter screens such that an outermost screen in said stack is individually removable from said stack and including a notch disposed in said lens sleeve radially adjacent said stack of outer filter screens so as to provide access to perimeter portions of said outer screens for enabling one to grasp the outermost of said outer filter screens and peel said outermost screen from said stack upon said outermost screen being damaged whereby laminar gas flow through said lens assembly is maintained and the useful life of the assembly prolonged.

4. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, a plurality of annular fine mesh inner filter screens mounted in fixed axially-spaced disposition about said lens body in said gas chamber, a stack of adjacently disposed and axially aligned annular outer filter screens mounted about said lens body in said gas chamber outwardly of said fine mesh filter screens such that an outermost screen in said stack is individually removable from said stack and including a notch disposed in said lens sleeve radially adjacent said stack of outer filter screens so as to provide access to perimeter portions of said outer screens and a tab member projecting outwardly from each of said outer filter screens in said stack into said notch for enabling one to grasp the outermost of said outer filter screens and peel said outermost screen from said stack upon said outermost screen being damaged whereby laminar gas flow through said lens assembly is maintained and the useful life of the assembly prolonged.

5. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, a plurality of annular fine mesh inner filter screens mounted in fixed axially-spaced disposition about said lens body in said gas chamber, a plurality of fixed rings disposed in a sandwich configuration between said inner filter screens to provide a desired predetermined axial spacing therebetween, a stack of adjacently disposed and axially aligned annular outer filter screens mounted about said lens body in said gas chamber outwardly of said fine mesh filter screens such that an outermost screen in said stack is individually removable from said stack, said outer filter screens being individually held in said gas chamber by a retaining ring disposed about said lens body and including a notch disposed in said lens sleeve radially adjacent said stack of outer filter screens so as to provide access to perimeter portions of said outer screens for enabling one to grasp the outermost of said outer filter screens and peel said outermost filter screen from said stack upon said outermost screen being damaged whereby laminar gas flow through said lens assembly is maintained and the useful life of the assembly prolonged.

6. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, a plurality of annular fine mesh inner filter screens mounted in fixed axially-spaced disposition about said lens body in said gas chamber, a plurality of fixed rings disposed in a sandwich configuration between said inner filter screens to provide a desired predetermined axial spacing therebetween, a stack of adjacently disposed and axially aligned annular outer filter screens mounted about said lens body in said gas chamber outwardly of said fine mesh filter screens such that an outermost screen in said stack is individually removable from said stack, said outer filter screens being individually held in said gas chamber by a retaining ring disposed about said lens body and including a notch disposed in said lens sleeve radially adjacent said stack of outer filter screens so as to provide access to perimeter portions of said outer screens and a tab member projecting outwardly from each of said outer filter screens in said stack into said notch for enabling one to grasp the outermost of said outer filter screens and peel said outermost filter screen from said stack upon said outermost screen being damaged whereby laminar gas flow through said lens assembly is maintained and the useful life of the assembly prolonged.

7. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, a plurality of annular fine mesh inner filter screens mounted in fixed axially-spaced disposition about said lens body in said gas chamber, at least one annular wave-shaped spacer disc disposed in a sandwich configuration between said inner filter screens, said disc defining an elevational component for axially positioning said inner screens in a desired predetermined spaced relationship, a stack of adjacently disposed and axially aligned annular outer filter screens mounted about said lens body in said gas chamber outwardly of said fine mesh filter screens such that an outermost screen in said stack is individually removable from said stack and gripping means for enabling one to grasp the outermost of said outer filter screens and peel said outermost screen from said stack upon said outermost screen being damaged whereby laminar gas flow through said lens assembly is maintained and the useful life of the assembly prolonged.

8. The gas lens assembly of claim 7 wherein said gripping means comprises a notch disposed in said lens sleeve radially adjacent said stack of outer filter screens so as to provide access to perimeter portions of said outer screens.

9. The gas lens assembly of claim 7 wherein said gripping means comprises a notch disposed in said lens sleeve radially adjacent said stack of outer filter screens so as to provide access to perimeter portions of said outer screens and a tab member projecting outwardly from each of said outer filter screens in said stack into said notch.

10. A gas lens assembly for use in a gas shielded welding torch to provide laminar gas flow to a the weld puddle, said assembly comprising a lens body, a lens sleeve disposed about and spaced from at least a portion of said lens body so as to define a gas chamber therebetween, a plurality of annular fine mesh inner filter screens and spacer rings mounted in a fixed sandwich configuration in said gas chamber wherein said rings are disposed between said screens so as to space said screens axially apart a predetermined distance, a stack of flat adjacently disposed and axially aligned annular outer filter screens mounted about said lens body in said gas chamber outwardly of said fine mesh filter screens, each of said outer screens in said stack being individually held in said gas chamber between said lens body and said lens sleeve such that an outermost screen in said stack is individually removable from said stack, and wherein each of said outer screens defines a tab member projecting outwardly therefrom thereby enabling one to grasp the outermost of said filter screens and peel said outermost filter screen from said stack upon said outermost screen being damaged whereby laminar gas flow through said line assembly is maintained and the useful life of said assembly prolonged.

11. The gas lens assembly of claim 10 wherein said fine mesh inner filter screens have a mesh size of about 200 and said outer filter screens define a mesh size within the range of about 60 to 100.

12. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, a plurality of annular fine mesh inner filter screens and spacer rings mounted in a fixed sandwich configuration in said gas chamber wherein said rings are disposed between said screens so as to space said screens axially apart a predetermined distance, a stack of flat adjacently disposed and axially aligned annular outer filter screens mounted about said lens body in said gas chamber outwardly of said fine mesh filter screens, each of said outer screens in said stack being held in said gas chamber between said lens body and said lens sleeve such that an outermost screen in said stack is individually removable from said stack, and wherein said lens sleeve defines a notch therein radially adjacent said stack of outer filter screens so as to provide access to perimeter portions of said outer screens enabling one to grasp the outermost of said outer filter screens and peel said outermost screen from said stack upon said outermost screen being damaged whereby laminar gas flow through said lens assembly is maintained and the useful life of the assembly prolonged.

13. The gas lens assembly of claim 12 wherein said fine mesh inner filter screens have a mesh size of about 200 and said outer filter screens define a mesh size within the range of about 60 to 100.

14. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, a plurality of annular fine mesh filter screens and wave-shaped spacer discs mounted in a fixed sandwich configuration in said gas chamber wherein said discs define an elevational component and are disposed between said screens so as to space said screens axially apart a predetermined distance, a flat outer screen mounted about said lens body in said gas chamber outwardly of said fine mesh filter screens, said outer screen defining a mesh coarser than said inner screen.

15. The gas lens assembly of claim 14 wherein said wave-shaped spacer discs are of an open mesh configuration so as not to adversely affect the gas flow therethrough and define a first plurality of contact surfaces for abutting one of said inner fine mesh filter screens and a second plurality of contact surfaces for abutting one of said inner or said outer filter screen, said first plurality of contact surfaces being axially spaced from said second plurality by a distance equal to said elevational component.

16. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, a plurality of annular fine mesh filter screens and wave-shaped spacer discs mounted in a fixed sandwich configuration in said gas chamber wherein said discs define an elevational component and are disposed between said screens so as to space said screens axially apart a predetermined distance, a stack of flat adjacently disposed and axially aligned annular outer filter screens mounted about said lens body in said gas chamber outwardly of said fine mesh filter screens, said outer screens defining a mesh coarser than said inner screens and each of said outer screens in said stack being held in said gas chamber between said lens body and said lens sleeve such that an outermost screen in said stack is individually removable from said stack whereby upon the outermost screen being damaged, said screen can be removed, laminar gas flow through said lens assembly is maintained and the useful life of the assembly prolonged.

17. The lens assembly of claim 16 including gripping means for enabling one to grasp the outermost of said outer filter screens and peel said outermost screen from said stack.

18. The gas lens assembly of claim 16 wherein said wave-shaped spacer discs are of an open mesh configuration so as not to adversely affect the gas flow therethrough and define a first plurality of contact surfaces for abutting one of said inner fine mesh filter screens and a second plurality of contact surfaces for abutting one of said inner or said outer filter screen, said first plurality of contact surfaces being axially spaced from said second plurality by a distance equal to said elevational component.

19. The gas lens assembly of claim 17 wherein said gripping means comprises a notch disposed in said lens sleeve radially adjacent said stack of outer filter screens so as to provide access to perimeter portions of said outer screens.

20. The lens assembly of claim 17 wherein said gripping means comprises a notch disposed in said lens sleeve radially adjacent said stack of outer filter screens so as to provide access to perimeter portions of said outer screens and a tab member projecting outwardly from each of said outer filter screens in said stack into said notch.

21. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, a plurality of annular fine mesh inner filter screens and spacer rings mounted in a fixed sandwich configuration in said gas chamber wherein said rings are disposed between said screens so as to space said screens axially apart a predetermined distance, a stack of flat adjacently disposed and axially aligned annular outer filter screens mounted about said lens body in said gas chamber outwardly of said fine mesh filter screens, each of said outer screens in said stack being held in said gas chamber between said lens body and said lens sleeve such that an outermost screen in said stack is individually removable from said stack whereby upon the outermost screen being damaged, said screen can be removed, laminar gas flow through said lens assembly is maintained and the useful life of the assembly prolonged.

22. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, a plurality of annular fine mesh filter screens and wave-shaped spacer discs mounted in a fixed sandwich configuration in said gas chamber wherein said discs define an elevational component and are disposed between said screens so as to space said screens axially apart a predetermined distance, a stack of flat adjacently disposed and axially aligned annular outer filter screens mounted about said lens body in said gas chamber outwardly of said fine mesh filter screens, said outer screens defining a mesh coarser than said inner screens and each of said outer screens in said stack being held in said gas chamber between said lens body and said lens sleeve such that an outermost screen in said stack is individually removable from said stack whereby upon the outermost screen being damaged, said screen can be removed, laminar gas flow through said lens assembly is maintained and the useful life of the assembly prolonged.

23. The gas lens assembly of claim 22 wherein said wave-shaped spacer discs are of an open mesh configuration so as not to adversely affect the gas flow therethrough and define a first plurality of contact surfaces for abutting one of said inner fine mesh filter screens and a second plurality of contact surfaces for abutting one of said inner or said outer filter screen, said first plurality of contact surfaces being axially spaced from said second plurality by a distance equal to said elevational component.

24. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, at least one layer of porous filter media mounted in a fixed disposition about said lens body in said gas chamber, a stack of adjacently disposed and axially aligned annular outer filter screens mounted about said lens body in said gas chamber outwardly of said filter media such that an outermost screen in said stack is individually removable from said stack, and gripping means for enabling one to grasp the outermost of said outer filter screens and peel said outermost screen from said stack upon said outermost screen being damaged whereby laminar gas flow through said lens assembly is maintained and the useful life of the assembly prolonged.

25. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, at least one layer of porous filter media mounted in a fixed disposition about said lens body in said gas chamber, a stack of adjacently disposed and axially aligned annular outer filter screens mounted about said lens body in said gas chamber outwardly of said filter media such that an outermost screen in said stack is individually removable from said stack, and including a notch disposed in said lens sleeve radially adjacent said stack of outer filter screens so as to provide access to perimeter portions of said outer screens for enabling one to grasp the outermost of said outer filter screens and peel said outermost screen from said stack upon said outermost screen being damaged whereby laminar gas flow through said lens assembly is maintained and the useful life of the assembly prolonged.

26. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, at least one layer of porous filter media mounted in a fixed disposition about said lens body in said gas chamber, a stack of adjacently disposed and axially aligned annular outer filter screens mounted about said lens body in said gas chamber outwardly of said filter media such that an outermost screen in said stack is individually removable from said stack, and including a notch disposed in said lens sleeve radially adjacent said stack of outer filter screens so as to provide access to perimeter portions of said outer screens and a tab member projecting outwardly from each of said outer filter screens in said stack into said notch for enabling one to grasp the outermost of said outer filter screens and peel said outermost screen from said stack upon said outermost screen being damaged whereby laminar gas flow through said lens assembly is maintained and the useful life of the assembly prolonged.

27. A gas lens assembly for use in a gas shielded welding torch to provide laminar gas flow to a weld puddle, said assembly comprising a lens body, a lens sleeve disposed about and spaced from at least a portion of said lens body so as to define a gas chamber therebetween, at least one layer of porous filter media mounted in a fixed disposition about said lens body in said gas chamber, a stack of flat adjacently disposed and axially aligned annular outer filter screens mounted about said lens body in said gas chamber outwardly of said filter media, each of said outer screens in said stack being held in said gas chamber between said lens body and said lens sleeve such that an outermost screen in said stack is individually removable from said stack, and wherein said lens sleeve defines a notch therein radially adjacent said stack of outer filter screens so as to provide access to perimeter portions of said outer screens enabling one to grasp the outermost of said filter screens and peel said outermost filter screen from said stack upon said outermost screen being damaged whereby laminar gas flow through said line assembly is maintained and the useful life of said assembly prolonged.

28. The lens assembly of claim 27 wherein each of said outer screens defines a tab member projecting outwardly therefrom into said notch in said lens sleeve.

29. The lens assembly of claim 28 wherein said layer of filter media is comprised of a porous sintered metal filter disc.

* * * * *